Figure 1:
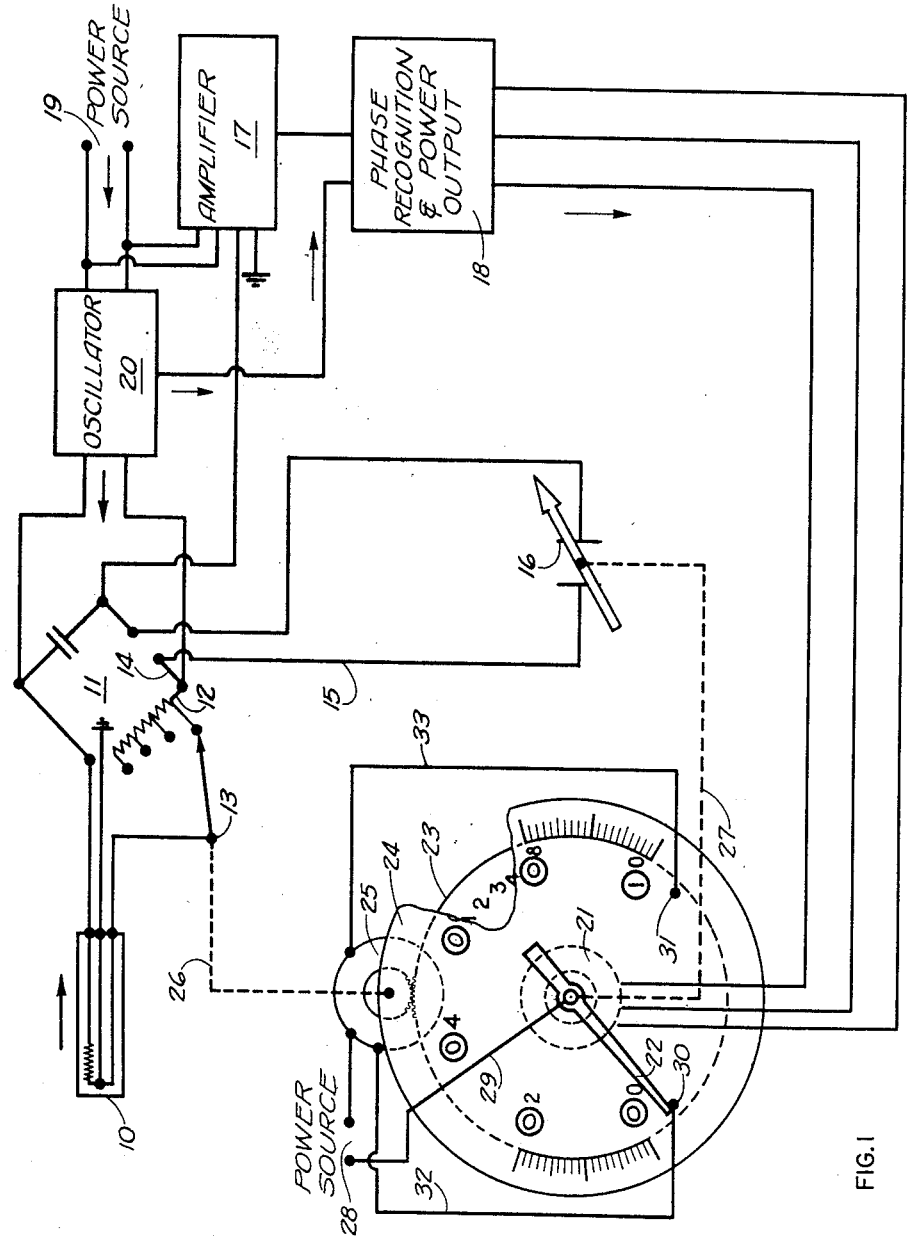
Figure 2:
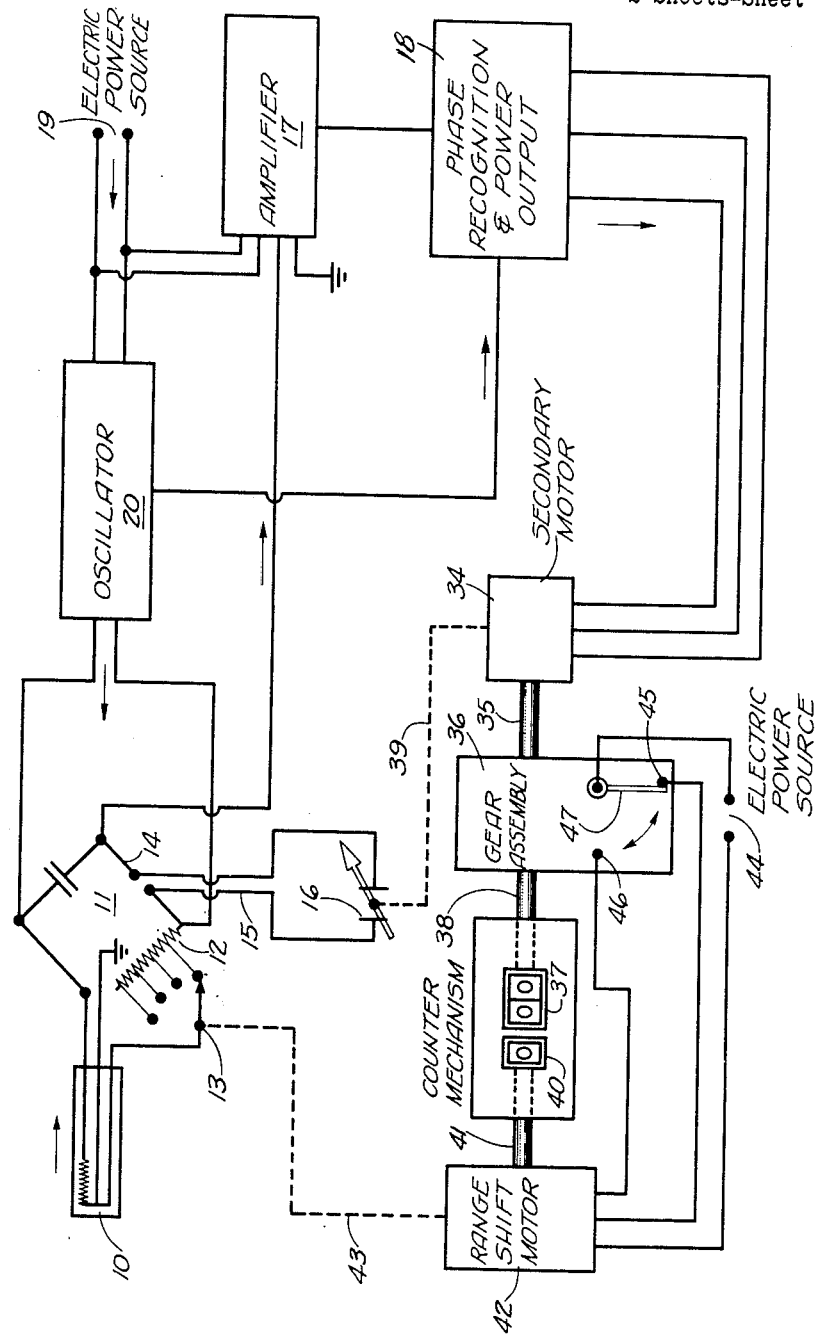

Sept. 22, 1953

A. ALLEN 2,653,308

RANGE SHIFTING INSTRUMENT

Filed Oct. 25, 1949

2 Sheets-Sheet 1

INVENTOR.
ALBERT ALLEN
BY *Austin, Morris & Safford*

INVENTOR.
ALBERT ALLEN

Patented Sept. 22, 1953

2,653,308

UNITED STATES PATENT OFFICE 2,653,308

RANGE SHIFTING INSTRUMENT

Albert Allen, Sharon, Mass., assignor to The Foxboro Company, Foxboro, Mass.

Application October 25, 1949, Serial No. 123,506

2 Claims. (Cl. 340—187)

This invention relates to instruments of the type used for indicating and/or recording values of variable conditions such as temperature, pressure and the like.

Used as a part of, or in association with such instruments are elements such as thermometers, sensitive to changes in the variable conditions, and devices such as dial indicators, chart and pen arrangement, and counter mechanisms, these devices being responsive, through the instruments, to the reactions of the sensing elements to variations of the conditions.

Each condition sensitive element is operable over a particular range of variable condition values, and each indicator, recorder, or counter, is operable over a particular range of indications.

This invention is concerned with the relation of the range of the condition sensitive element to the range of the indicator device. As an example of this relation in a prior art structure, a thermometer may be operable in the range of 0° F. to 100° F. and the associated indicator may be provided with a uniform 10 inch scale. Thus each inch of scale represents 10° of temperature change.

When greater accuracy is desired, arrangements are made to spread each 10 degrees of temperature change over the entire 10 inch scale so that each inch of scale represents one degree only, of temperature change.

Instruments have been provided in the past for automatically making such range changes. These instruments provide a primary indication for the part of the total range which is affected, that is, whether it is the 0–10° range step, or the 10–20° range step, or whatever it is, and a secondary indication for the value within the range step. If this value were 5, the indication would be 5, 15, 25, etc., depending on the range step involved. These past instruments, however, have utilized primary and secondary indications which were so separated as to necessitate two separate readings and their association in order to arrive at the final actual reading. This is a considerable disadvantage, with substantial possibility of error in reading.

In prior art structures, also, in going through several preliminary range steps to reach the required one, the secondary indication fluctuates over the entire scale as each preliminary range step is traversed. For example, referring to the temperature range steps suggested above, supposing the temperature to be 35° F., the instrument would automatically traverse the preliminary range steps of 0–10°, 10–20°, and 20–30°. As it went through these several preliminary steps, the secondary indication would repeatedly sweep over the entire scale of 1 to 10 inches, returning to its zero at the start of each new range step. This arrangement causes much undesirable wear on the instrument.

Accordingly, it is an object of the present invention to provide, in instruments of the type referred to above, automatic range changes with the primary, range step, indications and the secondary, value within the range step, indications provided as a combination of two indications into a single indication, requiring only a single reading, and an arrangement whereby the secondary indication does not fluctuate over the scale as preliminary range steps are traversed.

In illustrative embodiment of this invention, indicator devices are shown in the accompanying drawings and described herein in association with an automatic range shifting, electrical bridge circuit type of resistance thermometer.

In the drawings:

Figure I is a schematic illustration of a resistance thermometer using a dial indicator; and Figure II is a schematic illustration of a resistance thermometer using a counter mechanism indicator.

Referring to the resistance thermometer instrument shown as Figure I, its operation may be traced by starting at the upper left extremity of the drawing, where the resistance bulb 10 is located. This is the usual form of electrical resistance bulb, which is to be extended into the space containing the substance whose temperature is to be determined.

In the usual manner, the output of the resistance bulb is used to upset the electrical balance of an electrical bridge circuit, shown at the immediate right of the bulb 10, as 11. Certain features of this bridge should be noted briefly now, since other portions of the device will be later associated with them. First there is the lower left leg of the bridge 11, as at 12, which is in the form of a resistor with a number of divisions therein, each representing an addition or subtraction from the resistance of the bridge leg 12 to provide a different range step in the instrument. Further, the lower right leg of the bridge, as at 14, includes, as shown in the downward extension 15, an automatically variable condenser 16 for electrically rebalancing the bridge 11.

Now returning to the general operation of the instrument, the unbalance output of the bridge 11 is led, in the drawing, to the right of the bridge and passed through an amplifier 17. The amplifier output applies the amplified bridge unbalance to a phase recognition unit shown below the amplifier at 18. This unit determines the direction of the bridge unbalance, that is, whether the temperature of the resistance bulb 10 is being increased or decreased, and this unit 18 also includes a power output arrangement, with the output in the phase as determined. The bridge 11, the amplifier 17, and the phase and power output unit 18 are all supplied from the same electric power source, shown at the top right of the drawing, at 19. The amplifier is supplied directly, and the others through the adjacently shown oscillator 20.

The remainder of the instrument, shown at the left of the drawing as the recipient of the output of the phase recognition unit 18, may be termed the indicator unit. This unit is concerned with the provision of indications of the bridge unbalance and with means for actuating the bridge rebalancing units, namely, the previously mentioned range switch 13 and variable condenser 16.

The output of the phase recognition unit 18 is applied, in the indicator unit, to the centrally located electric reversible motor 21 which is thus operable to pivot the pointer 22. As a background over which the pointer 22 is pivoted, there are two indicator dials 23 and 24, one behind the other. The rear dial 23 is rotatable on the same axis as that of the pointer 22 by means of, at the top of the dial, a peripheral gearing arrangement with another reversible electric motor 25.

This dial rotation is mechanically independent of the pointer rotation, although electrically operatively associated therewith, as will be explained. On the rear, rotatable dial 23 there are numbers peripherally arranged for association with the pointer as the primary, range step, indications. The front dial 24 is fixed, and in alignment with the rotatable rear dial, with a peripheral arrangement of openings through which the rear dial numbers may be shown. Between the openings on the fixed dial, there are numbers for association with the pointer as the secondary, value within the range step, indications. The numbers on the fixed dial run from one to ten, and those on the rotatable dial, may, as shown, run in repeated groups of one to five. For example, if the reading is to be thirty four, the range dial is rotated until the repeated primary number three shows through all of the openings in the fixed dial at the same time, and the pointer is rotated to the secondary number four on the fixed dial. The total indication of thirty four is thus presented for reading in a single observation.

The operation of the indicator unit results in the rebalancing of the bridge 11, since the range switch 13 is mechanically connected to the rear dial motor 25 as indicated by the dotted line 26. The rotation of the rear, primary number range step dial 23 is thus automatically accompanied by operation of the switch 13 to change the range by adding or subtracting resistance in the bridge leg 12. Also the pointer motor 21 is mechanically connected to the variable condenser 16 as indicated by the dotted line 27. Pivoting of the pointer to an indication of the secondary number as the value within the range step, is thus accompanied by the bridge balancing operation of the variable condenser 16.

In the electrical arrangement of the indicator unit the pointer motor 21 is powered and operated from the output of the phase recognition unit 18. The dial motor 25 is operated from a power source indicated at 28, through a circuit which includes the pointer 22 through the lead 29. There are contacts on the fixed dial 24 at both ends of the scale at 30 and 31, with leads 32 and 33 therefrom to the dial motor 25. The only time the dial motor is energized is when its power circuit is completed by the engagement of the pointer 22 with one or the other of the contacts 30 and 31.

If the temperature of the resistance bulb 10 is being raised, the bridge unbalance in that direction results in clockwise movement of the pointer 22. If the temperature of the substance being measured is reached by the bulb 10 before the pointer reaches the contact 31, that is, if the temperature is within a single range step, there will be no movement of the rotatable dial 23 and no operation of the range switch 13. There will be, however, operation of the variable condenser 16 until the bridge 11 is rebalanced, and in consequence, the pointer 22 brought to rest, indicating the temperature at the point of rebalance.

If, however, the temperature is beyond the scope of a single range step, the pointer 22 will pivot until it engages the contact 31. It will hold this position, since the resistor arrangement in the bridge leg 12 is additive, energizing the dial motor 25 and in consequence the range switch 13, until the proper range step is reached. After this, the pointer will leave the contact 31 and settle back to the proper position within the range step as set up, moving the variable condenser 16 back until the bridge 11 is rebalanced, within the particular range step involved. In the opposite direction, that is, when the temperature of the resistance bulb is being lowered, the action is the same, except that it involves the use of the dial contact 30, with both the pointer motor and the dial motor reversed, because of the reversed phase of the bridge output. This instrument therefore, will follow up and down temperature variations.

With reference to Figure II, an alternate structure is shown. It will be noted that Figure II is the same as Figure I, with the exception of the indicating unit, which in Figure II is shown as utilizing counter units instead of dials.

In this structure, the output of the phase recognition unit 18 is applied, in the indicator unit, to the electric reversible motor 34 which is mechanically connected, through its shaft 35, to a gear assembly 36 which operates one counter unit indicated at 37, through the shaft 38. This corresponds, in Figure I, to the operation of the pointer 22 by the motor 21. The motor 34, Figure II, is also mechanically connected to the bridge balancing variable condenser 16 as indicated by the dotted line 39 just as, in Figure I, the motor 21 is connected to the condenser 16. The counter 37, then, is the secondary indicator, for registering the value within the range step.

Immediately beside the secondary counter indicator 37 is the primary counter indicator 40 which is mechanically independent of the counter 37 but electrically operatively associated therewith in the same relation as that of the primary and secondary dials of Figure I. The primary counter 40 is operated through shaft 41 by the electric reversible motor 42, corresponding to the primary motor 25, Figure I. The primary motor of Figure II is mechanically connected to the range switch 13 as indicated by the dotted line 43.

In the electrical arrangement of the indicator unit, Figure II, the secondary motor 34 is powered and operated from the output of the phase recognition unit 18. The primary motor 42 is operated from a power source indicated at 44, through a circuit which is completed only when the secondary counter 37 is at either its zero or its maximum position. Thus the contacts 45 and 46 in Figure II correspond to the fixed dial contacts 30 and 31 of Figure I. The gear assembly 36 is arranged to operate a contact arm 47 in suitable ratio arrangement, as the secondary counter 37 is operated. The contact arm 47 which engages the contact 45 at the zero reading of counter 37 and which engages the contact 46 at the maximum reading of the counter 37. The maximum reading, in this instance of the two digit counter 37, would be ninety nine.

The operation of the counter indicator unit of Figure II is essentially the same as that of the dial unit of Figure I in that the first action is the energization of the secondary indicator 37. If the temperature being measured is beyond the first range step, the secondary indicator is held at its maximum reading while the primary indicator 40 is traversing the preliminary range steps. The counter mechanism is operable in the same manner for both rising and falling temperature conditions, as long as the conditions are within the total range of the instrument.

If desired, printing counters may be used instead of or in conjunction with the indicating counters.

This invention, accordingly, provides in instruments of the type described, primary and secondary indications in single reading association and means for holding the secondary indication at one position while the primary indication traverses preliminary range steps.

I claim:

1. In a multi-range instrument wherein a measuring system measures the value of a variable condition, an indicating device for denoting said variable condition value, said device comprising a primary, rotatable, range dial with range division indicia thereon, a secondary, fixed, within-range dial concentric with said range dial and having within-range division indicia thereon, with said secondary indicia in adjacent, aligned association with said primary indicia according to the position of rotation of said range dial, in indicator arm movable over said dials in cooperation with the said indicia thereon, driving means for said arm under the control of measurement signals in said measuring system, an electrical contact on said secondary dial, an electrical circuit including said indicator arm and said contact, driving means for said primary dial operated from an independent power source through said circuit, with the engagement of said arm and said contact necessary to the actuation of said primary dial driving means, and movement transfer connections between said primary dial driving means and said measuring system, and between said indicator arm driving means and said measuring system, as means of associating the operation of said indicating device with the operation of said measuring system.

2. In a multi-range instrument for the measurement of a variable condition, a sensing device responsive to said variable condition, an electrical bridge circuit responsive by unbalance to signals from said sensing device, range change means embodied in one arm of said bridge, bridge rebalance means embodied in another arm of said bridge, an indicating device operable from the unbalance output of said electrical bridge to indicate the value of said variable condition, said indicating device comprising a primary, rotatable, range dial with range division indicia thereon, a secondary, fixed, within-range dial concentric with said range dial and having within-range division indicia thereon, with said secondary indicia in adjacent, aligned association with said primary indicia according to the position of rotation of said range dial, an indicator arm movable over said dials in cooperation with the said indicia thereon, driving means for said arm under the control of the output of said bridge circuit, an electrical contact on said secondary dial, an electrical circuit including said indicator arm and said contact, driving means for said primary dial operated from an independent power source through said circuit, with the engagement of said arm and said contact necessary to the actuation of said primary dial driving means, a movement transfer connection between said primary dial driving means and said electrical bridge range change means, and a movement transfer connection between said indicator arm driving means and said electrical bridge rebalance means, whereby said indicating device responds to changes in said variable condition to produce movement for the rebalancing of said bridge and for changing the range of said indicating device and of said electrical bridge.

ALBERT ALLEN.

References Cited in the file of this patent

UNITED STATES PATENTS

| Number | Name | Date |
|---|---|---|
| 1,593,626 | Foote | July 27, 1926 |
| 1,661,555 | Bryce | Mar. 6, 1928 |
| 1,784,522 | Harrison | Dec. 9, 1930 |
| 2,115,834 | Young | May 3, 1938 |
| 2,162,093 | Madden | June 13, 1939 |
| 2,208,728 | Menzer | July 23, 1940 |
| 2,291,150 | Dimick et al. | July 28, 1942 |
| 2,346,121 | Weckerly | Apr. 4, 1944 |
| 2,439,094 | Miles | Apr. 6, 1948 |
| 2,458,022 | Phelps et al. | Jan. 4, 1949 |
| 2,517,455 | Waters | Aug. 1, 1950 |